Feb. 15, 1966  M. R. NORTH  3,235,010
LOAD DEPTH CONTROL VALVE
Filed Jan. 30, 1964  3 Sheets-Sheet 1

INVENTOR.
MAX R. NORTH
BY
WILSON, SETTLE & CRAIG
ATTORNEYS

Feb. 15, 1966  M. R. NORTH  3,235,010
LOAD DEPTH CONTROL VALVE
Filed Jan. 30, 1964  3 Sheets-Sheet 2

INVENTOR:
MAX R. NORTH
BY WILSON, SETTLE & CRAIG
ATTORNEYS

INVENTOR.
MAX R. NORTH
BY
WILSON, SETTLE & CRAIG
ATTORNEYS

United States Patent Office

3,235,010
Patented Feb. 15, 1966

3,235,010
LOAD DEPTH CONTROL VALVE
Max R. North, Racine, Wis., assignor to J. I. Case Company, Racine, Wis., a corporation of Wisconsin
Filed Jan. 30, 1964, Ser. No. 341,309
3 Claims. (Cl. 172—7)

The present invention relates to a hydraulic control system particularly adapted for tractor-implement correlation. More particularly, the instant application relates to a tractor hydraulic system which is responsive to the draft load imposed on the tractor by a ground engaging implement to control the position of the implement in accordance with such a load.

In tractor-implement systems, several distinct hydraulic actuating mechanisms have been proposed for correlating implement draft load with implement position, ostensively to maintain a constant load on the tractor. Such systems generally sense implement draft by means of a mechanical linkage to position an actuating valve component relative to the remainder of the hydraulic system to "raise," "lower," or to "hold" the implement to a desired position.

The requirements of accurate implement positioning necessitates relatively small incremental changes and relatively small fluid flows interiorly of an hydraulic mechanism in order that balance between the position and implement draft can be retained. Such relatively small changes are undesirable under extremely adverse operating conditions. For example, if a ground engaging implement, such as a plow, were to strike a buried obstacle, the slow elevation of the implement by the limited available fluid flow would not elevate the implement sufficiently rapidly to avoid damage. Similarly, in elevating the plow from the ground at the end of a furrow, rapid elevation is desired in order to minimize wasted or "turn around" time.

For these reasons, it is desired to provide a normal, relatively slow lifting operation for utilization under normal draft control operations and to provide a distinct high speed lift condition for use under circumstances where exact draft control is neither desired nor necessary, and, in fact, may be harmful.

The present invention provides an extremely simple, highly effective dual lift arrangement which fully satisfies the above conditions. The attainment of two lift conditions is premised upon the positioning of the main control valve component, i.e., a spool valve. The flow of fluid under pressure from the pump is subdivided by a flow-dividing mechanism into two separate streams. In the normal lifting operation, one of these streams is directed to the implement lift cylinder and the other stream is directed to the sump. A check valve is interposed between the two streams and is of a design such that it will not be actuated by normal or circulating (open-center) pump pressure. Upon actuation of the spool valve to an extreme position, the communicatiton of one stream with the sump is disrupted, and pump pressure is directed against the check valve to open the valve accommodating the full flow from the pump to the cylinder. The cylinder thus is acutated by a full pump flow and swift actuation thereof is insured.

It is, therefore, an important object of the present invention to provide a new and improved implement-actuating hydraulic system capable of rapidly elevating an implement under adverse conditions while still accommodating accurate draft control positioning of the implement under normal operating conditions.

Another important object of this invention is the provision of a valve control mechanism for an agricultural implement or the like, wherein a valve component is effective to divert a portion of the output of a pump to the sump while utilizing only the remainder of the pump output for actuation of a lift cylinder, the valve component being movable to a different position at which all of the pump flow is directed to the cylinder.

It is a further and no less important object of this invention to provide, in a tractor hydraulic system, an improvement whereby an implement can be elevated at two distinct speeds, one such speed utilizing a portion only of the output of the pump and the other such speed utilizing the total pump output, the two speeds being correlated by spool valve responsive to implement draft load and by a check valve responsive to pump pressure.

Other objects of this invention will appear in the following description and appended claims, reference being had to the accompanying drawings forming a part of this specification wherein like reference characters designate corresponding parts in the several views.

As explained above, the valve structure of the present invention is particularly adapted for utilization with a draft control mechanism for an agricultural type tractor.

Such a draft control mechanism is illustrated in the co-pending application of Evans L. Clarke, Serial No. 261,391 filed in the United States Patent Office on "Implement Controls" and assigned to the assignee of the present invention.

The draft control mechanism of this type utilizes a sensing linkage by means of which a signal is transmitted to a control valve. This control valve regulates the vertical positioning of the implement so that the tractor is subjected to substantially constant load or "draft." Inasmuch as the present invention is concerned only with the control valve mechanism, and since the sensing mechanism is well illustrated in said co-pending application of said Evans L. Clarke, the disclosure hereof is directed solely to the valve mechanism.

Figure 1:
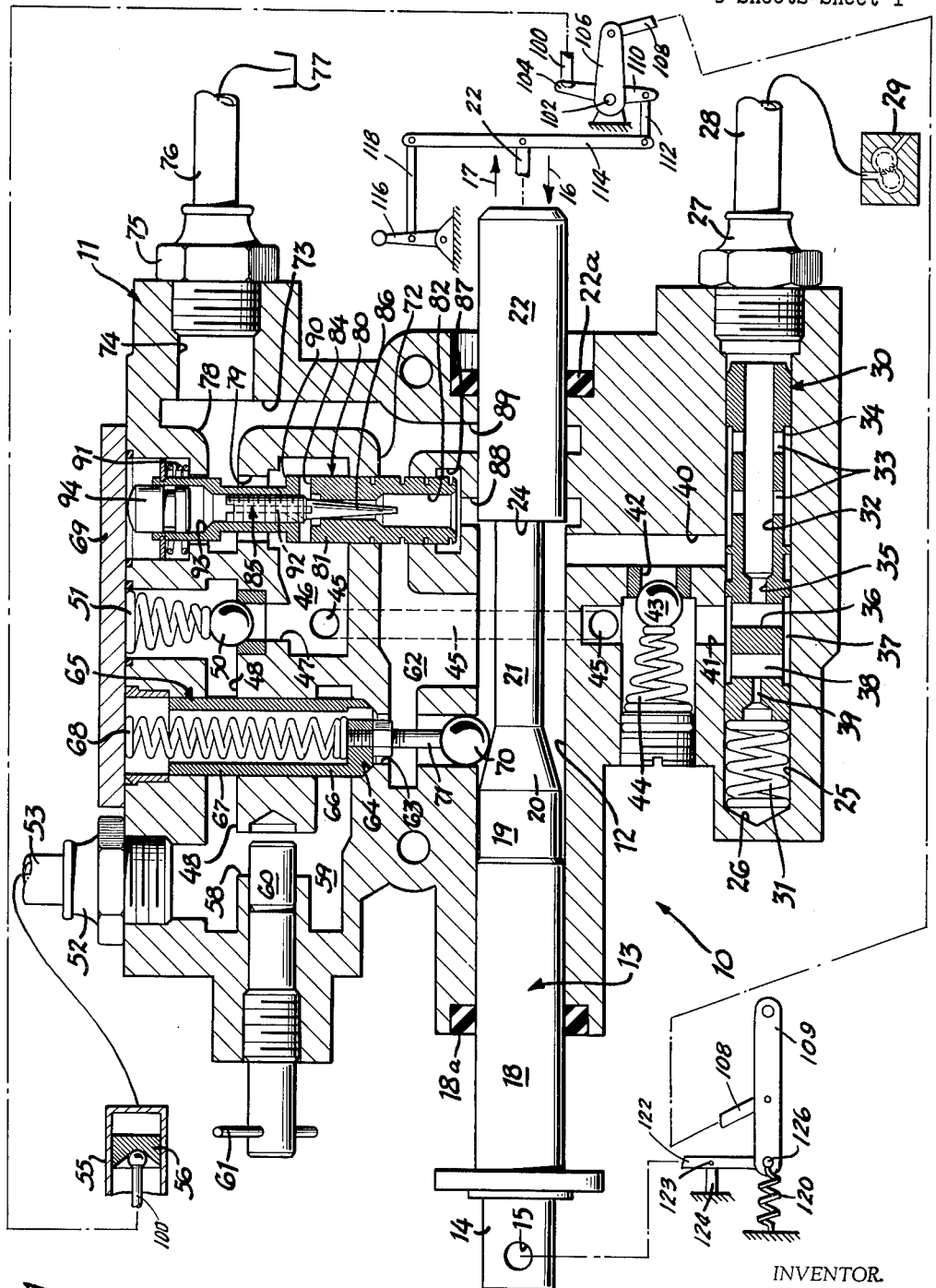
FIGURE 1 is a vertical sectional view with parts shown in elevation, of a control mechanism of the present invention, the mechanism being illustrated in a neutral or "holding" position.

As illustrated in FIGURE 1 of the drawings, reference numeral 10 refers generally to a valve mechanism of the present invention, this valve mechanism including a unitary case 11 provided with a transverse bore 12 of substantially constant diameter, and in which is positioned a control valve spool 13 having one end 14 thereof projecting at all times beyond the valve case 11; the spool end 14 is apertured at 15 for attachment to the draft-sensing mechanism. Thus, the positioning of the valve spool 13 axially in the bore 12 is a function of the draft to which the tractor is subjected. An increased draft upon the implement, as where the implement encounters increased soil resistance, displaces the value spool 13 to the left, i.e., in the direction of directional arrow 16, while decreased draft, as where the implement encounters decreased soil resistance, will displace the valve spool 13 to the right, i.e., in the direction of directional arrow 17.

The valve spool 13 is provided with a first generally cylindrical blocking portion 18 snugly received in the bore 12 and sealingly engaged by a peripheral sealing element 18a, a second cylindrical portion 19 of somewhat reduced diameter, a third conically chamfered portion 20 merging into a reduced diameter cylindrical portion 21, and an increased diameter cylindrical portion 22, located at the extreme righthand end of the valve spool and, again, sealingly engaged by a peripheral seal 22a. The juncture between the reduced diameter portion 21 and the terminal blocking portion 22 is sharply defined by a radial shoulder 24.

Located adjacent the lower extremity of the valve case 11 is a lower cylindrical recess 25 having a closed blind end 26 and communicating at its other end, as through a threaded fitting 27, with a pressure fluid conduit 28 connecting the passage 25 to the outlet side of the pump 29. Positioned within the passage 25 is an elongated, cylindrical flow-divider valve 30 constantly urged to the right by a compression spring 31 mounted against the closed end 25. This flow-divider valve has an internal bore 32 communicating through radial ports 33 with an exterior peripheral recess 34. The lefthand end of the bore 32 communicates through a reduced aperture 35 with a transverse port 36 opening onto a second peripheral groove 37, interconnecting the port 36 with a second transverse port 38. This second port 38 is vented to the free forward extremity of the valve element 30 by a reduced diameter axial bore 39.

Figure 6:
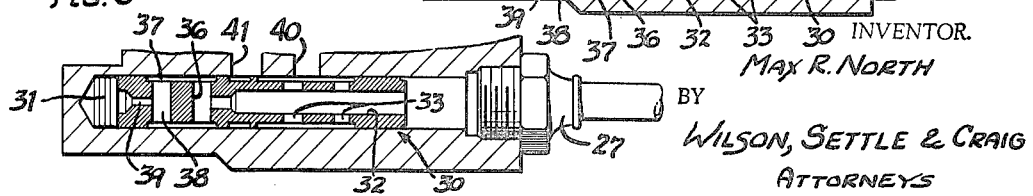
FIGURE 6 is a fragmentary sectional view illustrating a different function of the flow divider mechanism.

The function of the flow-divider valve will be readily appreciated by comparison of FIGURE 1 and FIGURE 6.

Primarily, the flow-divider valve serves to direct fluid from the pump outlet conduit 28 to valve body ports 40 and 41, this distribution being accomplished through the valve bore 32 and the radial ports 33, 36 and 38. Further, the spring 31 will bias the valve body to the right, aided by pressure from fluid flowing through the restricted port 39 into the bore 25 at the lefthand side of the body 30.

The valve body 30 normally assumes its position of FIGURE 1. The relative sizes of the bore 32 and the port 35 are such that, in normal operation, utilizing a ten gallon per minute output pump 29, four gallons per minute are delivered to the passage 41, and six gallons per minute are delivered to the passage 40.

However, when the pump is first started and there is no effective pressure at the lefthand end of valve body 30, pressure from the pump will displace the valve body 30 to the left, so that fluid under pressure will be distributed by the ports 33 and the peripheral groove 34 directly into ports 40 and 41. Thus, the full flow of the pump is delivered to the two passageways, the flow-divider is momentarily ineffective, and the full output of the pump can be delivered to port 41 or to both ports 40 and 41, depending on the displacement of valve body 30. This reaction is instantaneous and the flow-divider valve body 30 thereafter will assume its normal position.

It will be noted that the passages 40, 41 are interconnected by means of a passage 42, this passage normally being closed by a ball-check valve 43 which is urged against its seat by means of a compression spring 44. When the pressure in the passage 40 exceeds the biasing force of the spring 44, the passage 42 interconnects the passages 40, 41 for reasons to be hereinafter more fully described.

It will be noted that the passage 40 communicates freely with the valve spool passage 12, while the passage 41 opens onto a by-pass passage 45 (schematically illustrated in dotted outline), this passage 45 interconnecting the fluid under pump pressure from the passage 41 with an upper chamber 46. The chamber 46 communicates through a passage 47 with an upper body passage 48 closed by a cover plate 69. Communication between the passages 47 and 48 is controlled by a ball-check valve 50 interposed therebetween and urged to a seated position by a compression spring 51 bottomed against the plate 69.

The passage 48 communicates through a fitting 52 with a conduit 53 leading to the tractor lift actuating cylinder 55. When the fluid under pressure delivered to the chamber 46 is of sufficient pressure to overcome the compressive force of the spring 51, the ball-check valve 50 is unseated, and this fluid under pressure flows through the passage 48 and the conduit 53, into the cylinder 55, to displace a piston 56 in a direction to elevate the implement linkage. As is well known in the art, with reference to the schematic representation of reduced scale in FIGURE 1, the forward displacement of the piston 56 extends the piston rod 100 against an arm 104 non-rotatably secured to the rockshaft, thereby inducing counterclockwise rotation (as view in FIGURE 1) of a rockshaft 102. Such rotation of the rockshaft correspondingly rotates a pair of lift arms 106, which are non-rotatably secured to the rockshaft to raise the implement through elevation of the lift links 108 and the draft arms 109, the lift links being pivotally connected to the lift arms. Lowering of the implement is accomplished in an analogous manner, with the weight of the implement causing fluid to be exhausted from the cylinder 55 accommodating clockwise rotation of the rockshaft 102.

Pivotally interconnected follow-up links 110, 112, and 114 (link 110 being non-rotatably carried by the rockshaft 102) act as a follow-up to insure that raising and lowering of the implement are obtained in small incremental steps to avoid over correction. A hand lever 116, pivotally attached to the link 114 by a link 118, is used to manually set the desired draft to be exerted by the tractor upon the implement.

Positive and negative changes in draft exerted upon the draft arms 109 respectively extends and retracts the coiled tension spring 120, which spring is interposed between the tractor and the draft arms as schematically illustrated in FIGURE 1. As the spring 120 is extended the draft arms are displaced toward the rear, while retraction of the spring displaces the draft arms in a forward direction. Such displacement of the draft arms correspondingly shifts the valve spool 13 by pivoting a lever link 122 about its pivotal connection at 123 with a tractor support 124, lever link 122 being pivotally joined to the draft arms at 126 and to the spool at 15.

The conduit 53 to the cylinder 55 also communicates through a passage 58 with a chamber 59 in which is interposed a regulator valve 60. This valve 60 is manually movable, as by a handle 61, to vary the cross-section of the passage 58 and, accordingly, to vary the resistance to the flow of fluid through the passage 58. The chamber 59 is interconnected to central or main valve body chamber 62 by means of a passage 63 having a chamfered valve seat 64 formed therein. Cooperating with this chamfered valve seat 64 is a lowering piston valve body 66, indicated generally at 65, having a lower sealing surface valving face cooperable with the seat 64. A vertically elongated portion 67 of the valve body 65 encloses a compression spring 68 reacting against the valve cover plate 69 to urge the valve body toward its lower, seated position. The valve body 65 is actuated against the compression of the spring 68 by means of an actuating ball 70 contacting the conical chamfered portion 20 of the valve spool 13 and adjustably interconnected to the valve body by means of a threaded stem 71.

Figure 2:
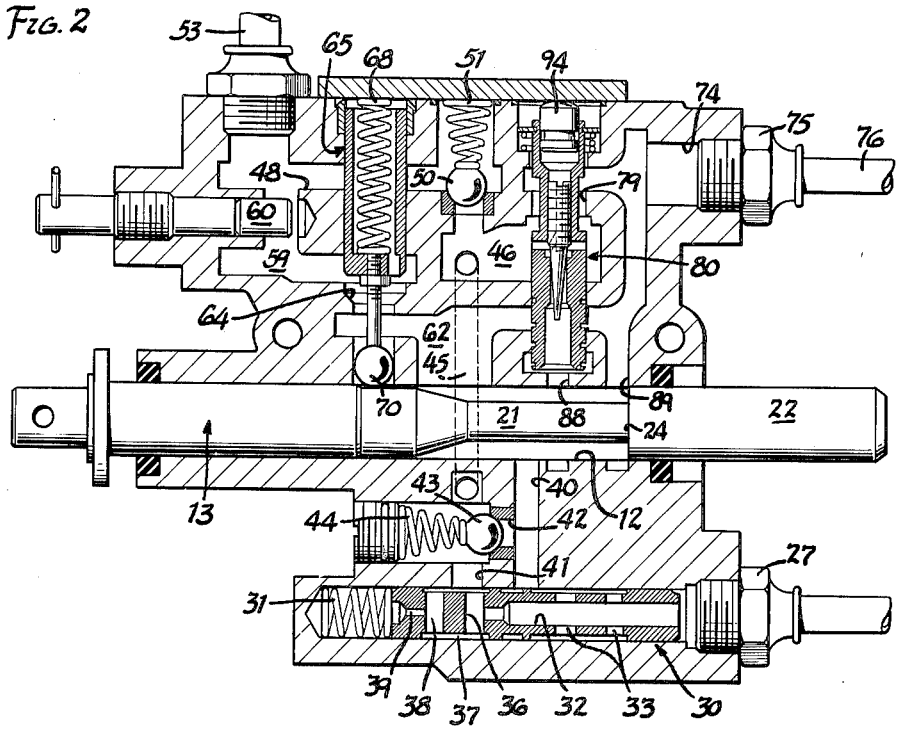
FIGURE 2 is a view similar to FIGURE 1 and illustrating the mechanism in an adjusted "floating" position.
Figure 3:
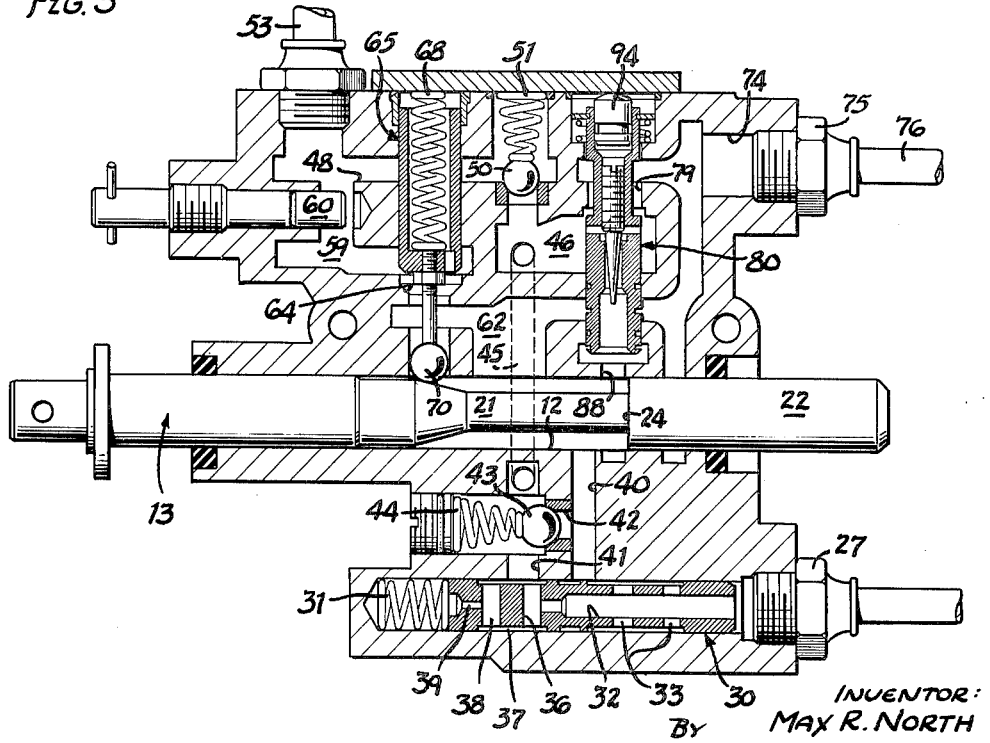
FIGURE 3 is a view similar to FIGURE 1 but illustrating the mechanism in a "lowering" position.

Obviously, the function of the valve body 65 is to control the interconnection of the chambers 59 and 62, these chambers being interconnected whenever the spool 13 is displaced in the direction 17 to a sufficient extent. FIGURES 2 and 3 illustrate circumstances under which the valve body 65 is "open." Also, it will be noted that the pump supply passage 40 normally communicates with the chamber 62 (FIGURES 1, 2, 3 and 4).

The chamber 62 communicates through a passage 72 and a second passage 73 with a sump chamber 74. The chamber 74 opens, through a fitting 75 and a line or conduit 76, onto the hydraulic system sump 77. The sump chamber 74 is also connected to the chamber 46 by means of a passage 78 and a vertical bore 79.

The flow of fluid under pressure from the passage 46, through the bore 79 and to the sump chamber 74, is controlled by means of a poppet valve, indicated generally at 80. This poppet valve 80 comprises a valve body 81 having an axial bore 82 intersected by a transverse bore 84. Threaded into the axial bore is a poppet valve plug 85 threadedly adjustable therein and having a lowered tapered portion 86 positioned in the valve body bore 82. The tapered plug portion 86 provides for the flow of a metered amount of liquid under pressure from the chamber 46 through the transverse passage 84, downwardly through the bore 82, to a lower chamber 87, this chamber 87 communicating with the spool bore 12 through a passage 88.

The poppet valve 80 is provided with a peripheral shoulder 90 cooperable with the passage 79 to control the flow of liquid from the chamber 46 into the sump chamber 74. Primarily, the valve 80 is urged upwardly, i.e., to a closed position, by means of a compression spring 91, and is urged downwardly, i.e., to an open position, by means of fluid under pressure from the chamber 46, vented upwardly through the poppet valve plug 85 (by means of plug bore 92) and acting upon the pressure area 93 of enlarged size. A poppet valve plug 94 reacts against the valve body cover plate 69 and serves to confine fluid under pressure against the enlarged area 93 to urge the valve to its opened position.

Additionally, it will be seen that the poppet valve 80 is acted upon by pressure exerted on the lower extremity thereof. Pressure within the chamber 62, for instance, can act upon the exposed lower face of the poppet valve body 81. This pressure, exerted through the spool bore 12 and the passage 88, tends to close the valve. Pressure in the chamber 46 normally acts only on the upper extremity of the valve (by means of the valve plug passage 92) and the upper exposed surface 93 of the valve body 81 to urge the valve to an opened position. However, if the passage 88 were closed by the spool valve land 22, fluid under pressure in the chamber 46 would also act upon the lower end of the valve body 81 (such pressure being vented between the valve body bore 82 and the tapered portion 86 of the valve plug 85) to close the valve. Since the exposed lower end of the poppet valve body 81 is larger than the exposed upper surface thereof, both differential pressure and the spring 91 tend to close the port 79.

An additional by-pass port 89 is provided in the valve case 11 to vent the spool passage 12 directly to the sump chamber 74 by passage 73 when the spool 13 is in its farthest righthand position. This port thus by-passes chamber 62 and dumps to the sump both pump flow from the passage 40 and return flow from the lowering valve 65.

Operation

The operation of the valve mechanism of the present invention will become apparent from a study of FIGURES 1 through 5 of the drawings.

Each of these figures illustrates a specific working position of the valve mechanism.

For example, FIGURE 1 illustrates a "holding" position of the valve mechanism and in which the piston 56 is merely being retained in an adjusted position within the cylinder 55, there being no appreciable flow of oil under pressure either into or out of the cylinder.

FIGURE 2 illustrates a "floating" position wherein an implement supported by the piston 56 merely "floats" on the cushion of oil provided in the cylinder 55.

In FIGURE 3, the valve is shown in a "lowering" position wherein oil confined in the cylinder is being forced by the piston 56 into the return port, oil from the pump 29 merely being by-passed to the sump.

Figure 4:
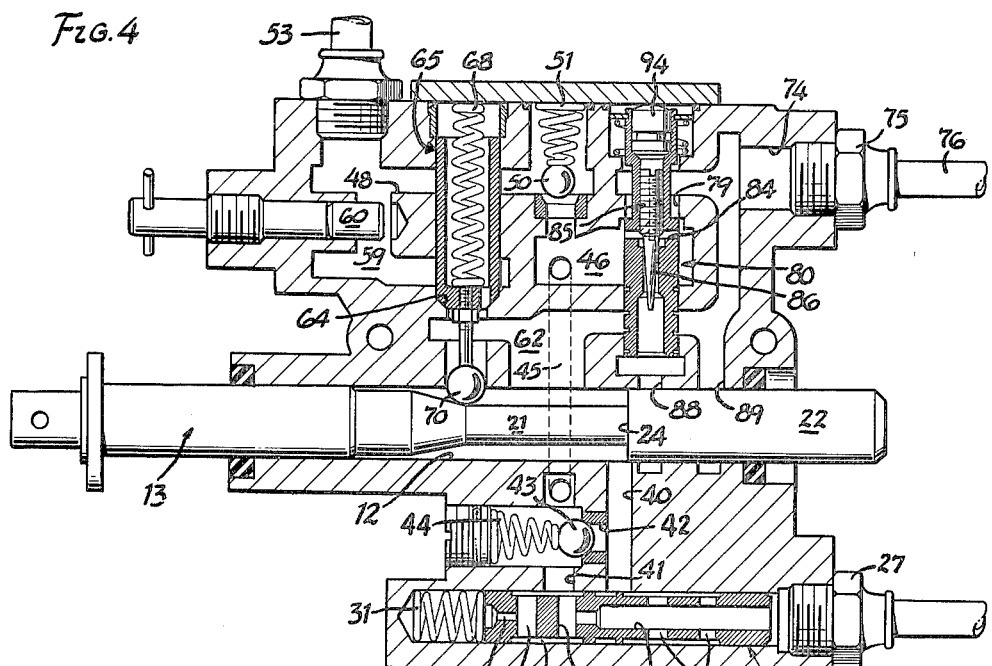
FIGURE 4 is a view similar to FIGURE 1 but illustrating the mechanism in a normal "raising" position.
Figure 5:
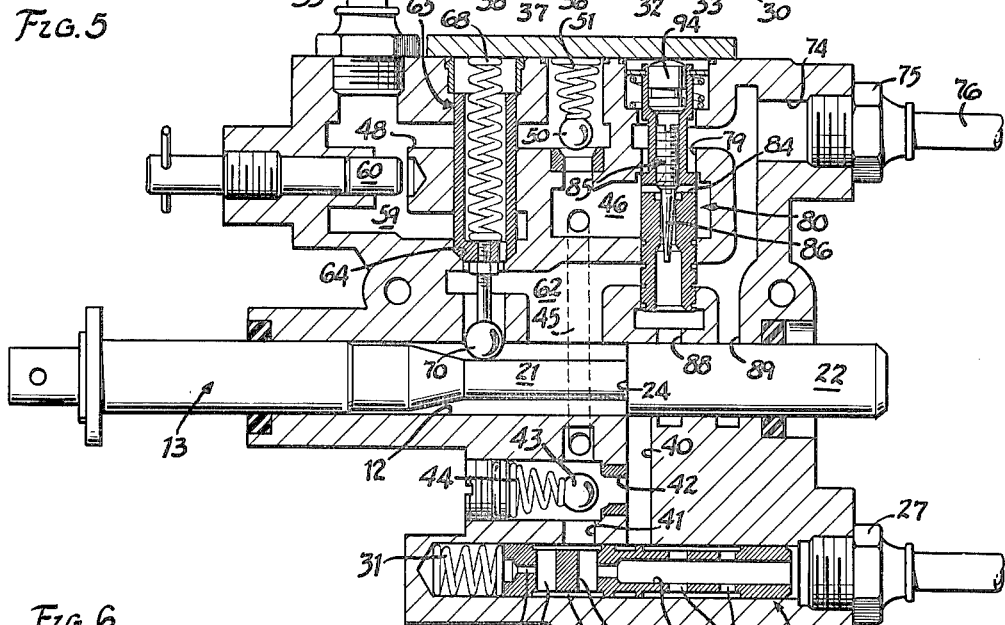
FIGURE 5 is a view similar to FIGURE 4 but illustrating the mechanism in an extreme "lifting" position.

FIGURE 4 illustrates a "normal" lift position wherein a portion of the oil under pressure from the pump 29 is introduced into the cylinder 55 to displace the piston 56 in a direction to elevate the implement; whereas, FIGURE 5 illustrates a "high speed lift" position wherein all of the oil from the pump is being directed into the cylinder 56 to displace the piston 55 in an implement-elevating direction. Each of these positions will be considered in detail in the following portion of this specification.

Holding position

As will be apparent from the foregoing description and from an inspection of FIGURE 1 of the drawings, it will be seen that oil under pressure from the pump 29, entering the bore 25, will be distributed by the flow-divider valve body 30. The major portion of this oil flows through the passage 40 into the spool valve bore 12 into the chamber 62, to exit through the passages 72 and 73 to the sump 77 through the conduit 76. The remainder of the oil from the pump will flow through the passages 41 and 45 to the chamber 46 and through the poppet valve controlled passage 79 into the sump chamber 74 and hence to the sump 77 through the conduit 76. Since the poppet valve 80 is open, there will not be sufficient pressure in the chamber 46 to elevate the ball-check 50. Similarly, the poppet valve 80 remains open by pressure exerted through passage 92 and acting on surface 93, since the lower passage 88 is effectively vented to the sump by bore 12, chamber 62 and passages 72, 73.

Fluid under pressure in the cylinder 55 cannot escape therefrom through the conduit 53 and the chamber 59, since the lowering valve 65 is closed. Thus, the oil in the cylinder 55 is effectively trapped therein, and the piston 56 will maintain the position to which it was originally actuated so long as the spool valve 13 remains in its illustrated position.

This holding condition of FIGURE 1 is determined by the positioning of the spool valve 13. So long as the spool is positioned so that the conical surface 20 does not elevate the lowering valve 65 to establish communication between the chambers 59 and 62, and so long as the spool valve land 22 accommodates the escape of fluid through the port 88 from under the poppet valve 80, the condition of FIGURE 1 will obtain.

Floating position

As illustrated in FIGURE 2 of the drawings, the valve spool 13 has been displaced to the right to an extent such as to upset the conditions of FIGURE 1.

Specifically, the valve spool 13 is displaced to the right to its farthest position, the spool land 22 being positioned to interconnect the spool passage 12 and the by-pass passage 89, so that pump flow through the port 40 flows directly to the sump conduit 76. The tapered spool land 19 elevates the lowering piston 65 sufficiently to fully open the valve seat 64, and fluid under pressure from the cylinder entering through conduit 53 can flow freely through the passage 59, the valve port 64 and the chamber 62, through the spool bore 12 and the by-pass passage 89 to the sump conduit 76. The poppet valve 80 also is open, since only sump pressure is exerted on its lower extremity, while pump pressure in the chamber 46 is exerted upon its upper extremity by virtue of the insert passage 92. Thus, the chamber 46 also is vented to the sump through the poppet passage 79. Thus, there is no pressure exerted upon the piston 56 to urge it in a leftward or lifting direction, and there is substantially no resistance to the egress of oil from the cylinder 55, allowing the oil trapped in the cylinder 55 to flow freely to the sump 77.

In most draft control implements, such as plows or the like, there is an equilibrium point which is attained at which the plow or the like tends to find its "natural operating depth." This "floating position" accommodates movement of the implement to its natural operating depth, since the draft links are not acted upon in any way by the hydraulic system. Thus, the spool valve can be moved to, and locked in, the position of FIGURE 2 to disable the draft control mechanism.

*Lowering position*

In FIGURE 3 there is illustrated a lowering position at which the implement is allowed to lower itself by its own weight, acting upon the piston 56 to urge the piston in a righthand direction interiorly of the cylinder 55. This position of FIGURE 3 also is assumed under those conditions of the draft linkage wherein the implement encounters less soil resistance, so that a greater operating depth can be attained.

Under these circumstances, the valve spool 13 is actuated to the right, i.e., toward a lowering position, from its position of FIGURE 1. Here the righthand land 22 blocks the by-pass passage 89, the shoulder 24 is positioned to leave the passage 88 open, thus subjecting the under side of the poppet valve 80 only to the pressure of the chamber 62, and the actuating ball 70 for the lower piston 65 contacts the chamfered surface 20 of the spool to elevate the lowering piston 65 from its seat 64.

Thus, fluid under pressure from the cylinder 55 can flow through the conduit 53 into the chamber 59 and through the valve passage 64 into the chamber 62. From the chamber 62 this fluid can flow through the passage 73 to the sump, through the sump chamber 74 and the conduit 76. Fluid under pressure from the pump conduit 28 flows through the passage 40 into the chamber 62 for ultimate flow through the sump conduit 76.

Fluid under pressure from the pump also flows through the passage 41 and the passage 45 into the chamber 46, and hence through the poppet valve port 79 to the sump. Any slight shifting of the spool valve 13 to the left would allow closure of the lowering valve 65 to establish the holding position of FIGURE 1.

*Normal raising position*

As illustrated in FIGURE 4 of the drawings, upon actuation of the valve spool 13 to the left (beyond the hold position of FIGURE 1), the actuating element 70 for the lowering piston 65 contacts the reduced diameter shank 21 of the spool, thereby closing the lowering piston upon its seat 64. Thus, oil flow in a return direction from the cylinder 55 through the line 53 is prevented, the chamber 59 being isolated from the chamber 62. Further, the valve land 22 and the shoulder 24 shut off the ports 88, 89. However, the passage 40 continues to communicate with the chamber 62, and pump flow through the passage 40 thus remains free to flow to the sump chamber 74 through the passages 72, 73.

The definite shutting of the passage 88 traps beneath the poppet valve body 80 the previously introduced body of fluid. Additional fluid under pressure from the chamber 46 will be metered thereinto about the conical extension 86 of the poppet plug 85, such fluid communicating with the chamber 46 through the transverse bore 84, and this fluid under pump pressure from the passage 45 and the passage 41 will be entrapped beneath the poppet valve body 80 to urge the valve in conjunction with the spring 91, to its upper, closed position.

Closure of the poppet valve port 79 will isolate the chamber 46 from the sump chamber 74, so that pump pressure in the chamber 46 will now elevate the check valve ball 50 against its spring 51 and fluid under pump pressure will flow through the passage 48 into the cylinder 55. The extent of this flow is determined by the flow-divider valve body 30, inasmuch as pump flow through the passage 40 is still being by-passed to the sump. Thus, the piston 56 will be urged leftward in the cylinder 55, thereby elevating, or "lifting," the implement.

*High speed lift position*

In the event that further lift capacity or a higher lifting rate is desired, it is merely necessary to displace the valve spool 13 to the left to the extent illustrated in FIGURE 5 of the drawings. Here it will be noted that the spool valve land 22 shuts off communication between the valve passage 40 and the chamber 62, while the remainder of the valve is in substantially its condition of FIGURE 4 of the drawings. The pressure in the passage 40 is sufficient to actuate the ball-check valve 43 to the left, so that the full pump flow, i.e., from both passages 40 and 41, now passes through the passage 45 into the chamber 46. Since the poppet valve port 79 remains closed, this full pump flow passes through the check valve 50 and the passage 48, into the cylinder conduit 53 to displace the piston 56 to the left, thereby lifting the implement.

*Summary*

From the foregoing description it will be seen that the present invention provides a new and novel arrangement whereby an axially shiftable spool valve is utilized to obtain five different conditions for controlling implement location and actuation.

Of particular merit is the dual lift capacity afforded by the positioning of the spool as illustrated in FIGURES 4 and 5. The high speed lift capability is extremely desirable when adverse field conditions are encountered, in that the swift elevation of the implement may well avoid damage to the implement. Since the attainment of this high speed lift capacity is correlated with the displacement of the valve spool to an extreme position, this actuation is self-policing. For example, if the implement were a plow which encountered a buried boulder, tree stump, or the like, the greatly increased draft of the implement would be reflected through the linkage to displace the valve spool to the extreme position, illustrated in FIGURE 5 of the drawings. The complete output is immediately exerted in a lift direction to elevate the implement from the obstruction.

If, however, a more mild set of circumstances gives rise to the necessity for implement elevation as, for example, upon merely encountering greater soil resistance, due solely to a soil condition, the linkage is actuated to an extent such that only the position of FIGURE 4 is attained. Under these circumstances, only a portion of the pump output capacity is utilized in elevating the implement, and the implement is elevated more slowly and in a manner more consistent with accurate control.

Another desirable feature is incorporated into the valve mechanism of the present invention by virtue of the flow-divider valve body 30. This flow-divider is primarily utilized to divide the pump flow for purposes of differential lift capacity, as above explained. However, upon initially starting the tractor, or other vehicle, it is desired that an initial capacity which is greater than normal, be provided. This is accomplished by means of the flow-divider valve which is actuated to the left (to its position of FIGURE 6) upon start up of the system, since there is no hydraulic pressure to supplement the spring 31. Since the output of the pump 29 is greater than the resistance of the spring 31, the valve 30 is actuated in a manner such that the port 41 receives greater than its normal share of the pump output, or even the total pump output. As soon as equilibrium is established, the pump pressure is counterbalanced by pressure at the lefthand end of the flow-divider valve which, supplementing the spring 31, positions flow-divider valve in its normal position of FIGURES 1 through 5.

While an exemplary embodiment of the invention has been described in detail, it will be apparent to those skilled in the art that the disclosed embodiment may be modified. Therefore, the foregoing description is to be considered exemplary rather than limiting, and the true scope of the invention is that defined in the follow-

What I claim as new is:

1. In a tractor hydraulic system having a valve case interposed between an implement-actuating cylinder and a pump and including a sump connection, and a valve spool axially displaceable in said valve case in accordance with the draft-induced performance of the implement, the improvements of axially displaceable flow-dividing means having an influent opening through which essentially all of the pump output flows and a plurality of effluent openings for splitting the pump output into two components, means responsive to the displacement of the spool valve to a first lift position to connect only one of said components to said cylinder to elevate said implement at a first rate of speed, and means responsive to the displacement of said spool valve to a second lift position to connect both of said components to said cylinder to elevate said implement at a second and greater rate of speed.

2. In a tractor hydraulic system, and implement-actuating cylinder energized by fluid under pressure from a source by means of a valve mechanism connecting the cylinder to the source through a pressure-actuated valve to elevate the implement and connecting the cylinder with a sump through a spool-actuated lowering valve to lower the implement, the spool being actuatable by the implement to a pair of separate axially spaced positions at each of which the cylinder is connected to said source, means interposed between said spool valve and said source to subdivide the flow of fluid into two separate streams, a check valve interposed between said separate streams to normally prevent co-mingling thereof, a flow passage interconnecting one of said streams and said sump when said spool valve is in one of its said positions, and a land on said spool valve blocking said flow passage to prevent the flow of said one stream to the sump when said spool valve is in the other of its said positions, said check valve accommodating the co-mingling of said streams for joint flow to said cylinder.

3. In a tractor hydraulic system including an implement-actuating cylinder connected to an implement through a linkage, the system also including a sump, a pump, and a valve mechanism interposed between the pump and the cylinder, the valve mechanism having a valve spool actuatable by the linkage to selectively connect the cylinder to the pump to elevate the implement and to connect the cylinder to a sump to lower the implement, the improvements of means for elevating the implement at two different speeds by respectively positioning the valve spool in a first lift position and in a second lift position comprising a spring-biased displaceable flow-dividing means interposed in fluid communication between the valve spool and the pump, said flow-dividing means having at least two discharge openings to divide the pump output flowing therethrough into two components, a first valve passage normally connecting one of the components to the sump, a second valve passage normally connecting the other component to the sump through a pressure-responsive poppet valve when the spool is situated in a neutral position and constantly connecting the other component to the cylinder through a check valve whenever the valve spool is positioned in either of its lift positions, the poppet valve being closed by pressure fluid confined by the spool, means on the valve spool for blocking the flow of the one component to the sump when said valve spool is in its second lift position, and a second check valve interconnecting the two passages and actuated by the pressure of the one component when blocked to connect both of the components with the cylinder.

References Cited by the Examiner
UNITED STATES PATENTS

| 2,737,196 | 3/1956 | Eames | 60—52 |
| 2,847,030 | 8/1958 | McRae | 60—52 |
| 2,851,938 | 9/1958 | Giertz et al. | 172—8 |
| 2,958,384 | 11/1960 | Hull | 172—2 |
| 3,120,278 | 2/1964 | Ashfield et al. | 172—9 |

FOREIGN PATENTS

| 626,604 | 8/1961 | Canada. |
| 1,222,459 | 1/1960 | France. |
| 1,233,544 | 5/1960 | France. |
| 1,314,084 | 11/1962 | France. |

ABRAHAM G. STONE, *Primary Examiner.*

F. B. HENRY, *Assistant Examiner.*